(12) United States Patent
Carré et al.

(10) Patent No.: US 6,715,892 B1
(45) Date of Patent: Apr. 6, 2004

(54) METHOD OF MAKING BEAM FOCUSING SURFACES, IN PARTICULAR AT GRAZING INCIDENCE AND APPARATUS FOR CARRYING IT OUT

(75) Inventors: Jean-François Carré, Pertuis (FR); Michel Detaille, Marseilles (FR)

(73) Assignee: Societe Europeene de Systemes Optiques, Aix-en-Provence (FR)

( * ) Notice: Subject to any disclaimer, the term of this patent is extended or adjusted under 35 U.S.C. 154(b) by 0 days.

(21) Appl. No.: 09/469,419

(22) Filed: Dec. 23, 1999

(30) Foreign Application Priority Data

Dec. 31, 1998 (FR) .............................. 98 16728

(51) Int. Cl.⁷ ................................. G02B 5/08
(52) U.S. Cl. .................. 359/846; 359/849; 359/900
(58) Field of Search ................. 359/846, 847, 359/848, 849, 851, 872, 900, 857

(56) References Cited

U.S. PATENT DOCUMENTS

| 1,615,358 | A | * | 1/1927 | Chubb |
| 2,707,903 | A | * | 5/1955 | Trombe |
| 3,628,852 | A | * | 12/1971 | Snaper |
| 3,645,606 | A | * | 2/1972 | La Vantine |
| 3,827,782 | A | * | 8/1974 | Boudouris et al. |
| 4,087,682 | A | * | 5/1978 | Kolodziej |
| 4,093,351 | A | | 6/1978 | Perkins et al. |
| 4,097,126 | A | * | 6/1978 | Mahlein et al. ............. 359/847 |
| 4,119,365 | A | * | 10/1978 | Powell |
| 4,557,569 | A | * | 12/1985 | Hacskaylo |
| 4,734,557 | A | * | 3/1988 | Alfille et al. |
| 5,089,915 | A | * | 2/1992 | Gobeli |
| 5,148,324 | A | * | 9/1992 | Van Amstel ................. 359/846 |
| 5,677,800 | A | * | 10/1997 | Soll et al. .................... 359/849 |
| 5,975,709 | A | * | 11/1999 | Ebinuma et al. ............. 359/847 |

FOREIGN PATENT DOCUMENTS

| EP | 0343861 A | 11/1989 |
| EP | 0 410 686 A | 1/1991 |

OTHER PUBLICATIONS

XP 002114969, Egle, et al., Oct. 31, 1990.

* cited by examiner

Primary Examiner—Ricky D. Shafer
(74) Attorney, Agent, or Firm—Alston & Bird, LLP

(57) ABSTRACT

The invention relates to a method of making a surface having a shape of an angular conic section for focusing optical beams. An angular conic section is understood to be a portion of a surface, which can be generated by rotating a generating line with the desired shape about an axis of rotation. It puts to practice the formation of a mirror or a mandrel of a truncated shape with a reference contour or reference contours (2, 4), and which is provided with a device (11, 13, . . . ) for deforming the reference contour or contours along at least one direction (F). The thus-produced mirror or mandrel can be common to a plurality of modules or rings of a WOLTER type telescope. The invention relates likewise to a mandrel or a mirror with a reference contour (2), characterized in that it is provided with a device (15, 16, . . . ) for adjusting the angle that is formed by the first and the second portion.

13 Claims, 3 Drawing Sheets

METHOD OF MAKING BEAM FOCUSING SURFACES, IN PARTICULAR AT GRAZING INCIDENCE AND APPARATUS FOR CARRYING IT OUT

FIELD OF THE INVENTION

The present invention relates to a method of making focusing surfaces, in particular grazing-incidence beam focusing surfaces.

BACKGROUND OF THE INVENTION

Focusing surfaces of this kind are, for example, WOLTER type I mirror modules that are intended for making an X-ray beam telescope at grazing incidence. The surface of a mirror module is a portion of a surface of revolution (generally a quadric of revolution) about an axis, which is the optical axis of the system. All the numerous modules are concentric (and of a different radius from one module to another) about the same optical axis of revolution. Since the surfaces of revolution of these modules are truncated by two planes perpendicular to the axis of rotation, we will hereafter name these surfaces "truncated with aspheric generating lines." A method of producing such modules is described, for example, in the article "The results of the X-ray mirror modules production for the ESA XXM Spacecraft," by D. de CHAMBUIRE, et al., published in the review of the International Conference on Space Optics (ICSO), which was held in Toulouse in 1997. These mirror modules are produced from double conical mandrels, which are machined to the final required form. The number of these mandrels is equal to the required module types.

Since the mandrels of revolution have a shape complementary to the mirrors being made, the final mirror is obtained either by molding, or by fusing a thin sheet of glass, or by replication from resin, or as described in the foregoing article by electrochemical metal plating in the presence of nickel.

The design and construction of these mandrels of revolution generates two disadvantages:
a) For large diameters, their manufacture requires larger and larger machines.
b) It is necessary to construct a new mandrel, when the module diameter of the telescope is varied.

Furthermore, a telescope project, such as the XEUS project of the ESA utilizes a large number of elementary WOLTER type I mirrors, which form among themselves assembled sections to form petals that are arranged according to the modules or rings. The foregoing technique involves the construction of as many mandrels as there are ring types (384 in the XEUS case).

SUMMARY OF THE INVENTION

The basic idea of the invention is to make angular conic sections, in particular with a desired aspheric generating line (instead of a linear generating line), for example, an angular section in particular from 10° to 20°, and to design them such that they are obtained by deformation. A conic section is understood to be a portion of a surface, which can be generated by rotating a generating line with a desired shape about an axis of revolution. An angular conic section with an aspheric generating line is understood to be any portion of a surface, which can be generated by rotating an aspheric generating line about an axis of rotation.

Once constructed, the different identical sectors will be assembled, so as to form a module of the telescope. The different modules, each formed from specific sectors, will be arranged so as to retain their common optical axis of rotation. They nest into one another.

The invention makes it possible to avoid the disadvantage a), since the use of sectors makes it possible to limit the dimension of the machines that are used for their construction, as well as disadvantage b), since by applying calibrated loads, it is possible to obtain from a single piece, mirror sectors corresponding to different telescope diameters, or otherwise to differently dimensioned modules or rings of the same telescope.

Thus, the invention relates to a method of making an optical beam focusing surface, characterized in that it uses the generation of, for example, a conic section with a reference contour, and which is provided with a device for deforming the reference contour along at least one direction to obtain a conic section, in particular with an aspheric generating line of a desired shape. Before its deformation, the reference contour may be, for example, plane, or truncated, or even cylindrical.

The method of the invention is suitable for constructing single-surface mirrors as well as mirrors with two angularly offset surfaces and with a shape of a conic section with an aspheric generating line, for example, WOLTER type mirrors.

According to a first variant, the mirror is obtained by deforming the mandrel, so that its contour defines an angular section with a predetermined desired shape that is complementary to that which is desired for the mirror. The mirror is then constructed by molding, replication, or metal plating. A subsequent separation makes it possible to obtain a mirror with the desired shape which is complementary to the desired shape of the reference contour. According to this variant, the mirror is thus obtained directly in its final shape, and the mandrel may be used to construct mirrors with different characteristics, which are obtained by deforming the mandrel in an appropriate manner. One will be able to produce mirrors pertaining to different modules of the same telescope with the same deformable mandrel.

According to a second variant, the mirror is directly obtained by depositing on the mandrel a coating that forms a reflecting surface. The method is characterized by the steps of:
Making a reference contour and a coating that forms a reflecting surface;
Deforming the reference contour according to a predetermined desired shape, so that the reflecting surface defines a mirror according to a sector of the desired shape.

According to this variant, the directly constructed mirror has however a shape which may vary by deformation.

The original surface that forms the reference contour may be plane. However, it may also be truncated (with a straight, spherical, or possibly aspheric generation), or preferably cylindrical, which facilitates greatly the initial polishing.

The deforming device may comprise a means for adjusting the deformation of the reference contour in a transverse direction and/or a longitudinal direction, so as to obtain the desired contour from the original surface.

The method can be characterized in that the reference contour has a first and a second portion that are hinged to each other, the first and the second portion having each a first and a second reference contour, and that:
The first portion is provided with a means for adjusting the deformation of the first reference contour in a transverse direction and/or a means for adjusting the deformation of the first reference contour in a longitudinal direction.

The second portion is provided with a means for adjusting the deformation of the reference contour in a transverse direction and/or a means for adjusting the deformation of the second reference contour in a longitudinal direction.

The zone between the first and the second portion is advantageously provided with a means for adjusting the angle that is formed by the first and second hinged portions.

The invention relates likewise to a mandrel with a reference contour, characterized in that it is provided with a means for deforming this reference contour along at least one direction.

Advantageously, the mandrel comprises a means for adjusting the reference contour along a transverse direction and/or a means for adjusting the reference contour along a longitudinal dimension.

According to a preferred embodiment, the mandrel is characterized in that the reference contour has a first and a second portion hinged to each other, the first and the second portion having each a first and a second reference contour and, advantageously, an adjustable angle between them, so as to produce, for example, sectors of different modules of a WOLTER type telescope, the modules having however a common axis of rotation and common focusing points.

According to an advantageous embodiment, the mandrel has at least one portion with a reference contour, which is adjustable along the transverse direction, and it as two pairs of end legs. In this embodiment, each portion receives at each end a jackscrew for adjusting the deformation in the transverse direction and a jackscrew for adjusting the angle between the two portions, without requiring a specific jackscrew for adjusting the deformation in a longitudinal direction of each portion. In numerous cases, this device may suffice to change from one contour of a ring or module over to that of following rings or modules.

BRIEF DESCRIPTION OF THE DRAWINGS

Other characteristics and advantages of the invention will become more apparent from reading the following description of an example without limiting it thereto in conjunction with the attached drawings, in which.

DETAILED DESCRIPTION OF THE INVENTION

It is therefore the object of the invention to generate a plurality of surfaces that are in particular usable for focusing optical beams at grazing incidence with a single deformable system.

These surfaces may have adjoining shapes of a conic section with an aspheric, in particular parabolic, hyperbolic, or elliptic generating line.

These surfaces may be concave or convex.

These variable complex shapes may be applied:

Either to the mandrels that are subsequently used to replicate mirrors by resin, nickel-plating, or molding. These mirror will be assembled, for example, to produce rings of a telescope (of the WOLTER type, for example, for X-rays);

Or directly to these (single or double) focusing mirrors.

The deforming device can be used:

For producing this type of surface from a plane, or cylindrical, or conical surface.

For changing from one ring form to another or several others.

Figure 1A:
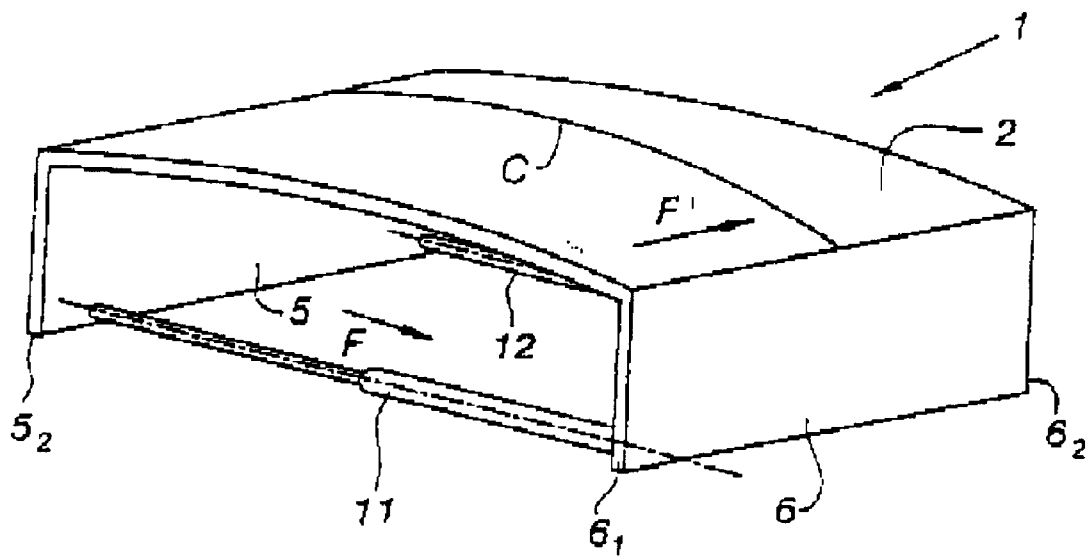
FIGS. 1a and 1b are respectively a perspective and a bottom view of a first embodiment of the invention adapted to the case of a deformation applied in one direction.
Figure 1B:
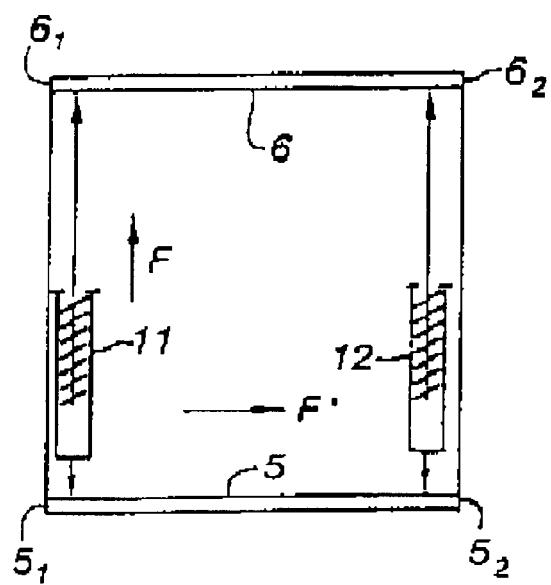

An apparatus 1 shown in FIGS. 1a and 1b has a reference contour 2, which extends perpendicularly to two of its ends by panels 5 and 6 with edges $5_1$, $5_2$ and $6_1$, $6_2$. Attached in the vicinity thereof are jackscrews 11 and 12, which are of a type that enables a precision adjustment. By applying a force that brings the panels 5 and 6 closer together or moves them apart, it is possible to apply a moment to the contour 2 and cause the curvature of contour 2 to vary in the transverse direction F. If the same force is applied to the two jackscrews, the variation of the transverse curvature C of contour 2 will be constant from one edge to the other of contour 2, as one changes position in the longitudinal direction F' perpendicular to the direction F. On the other hand, the application of a different force of deformation by jackscrews 11 and 12 makes it possible to vary slightly the curvature C of contour 2, when one changes position in the direction F'. This is in particular the case, when it is desired to change from a cylindrical form to a truncated form.

Figure 2A:
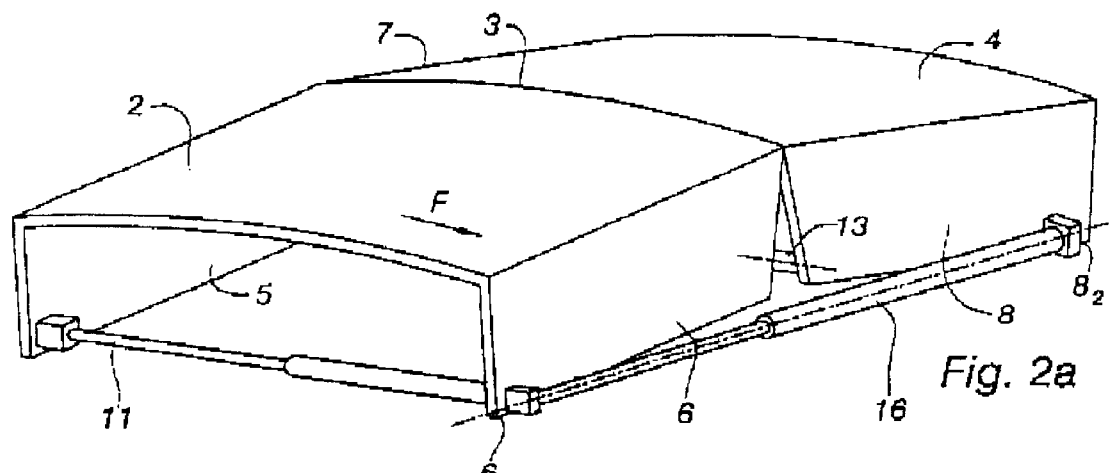
FIGS. 2a and 2b illustrate a second embodiment of the invention adapted to the case of a deformation applied in one direction for a mirror consisting of two hinged portions, with a variation of the angle between the two portions.
Figure 2B:
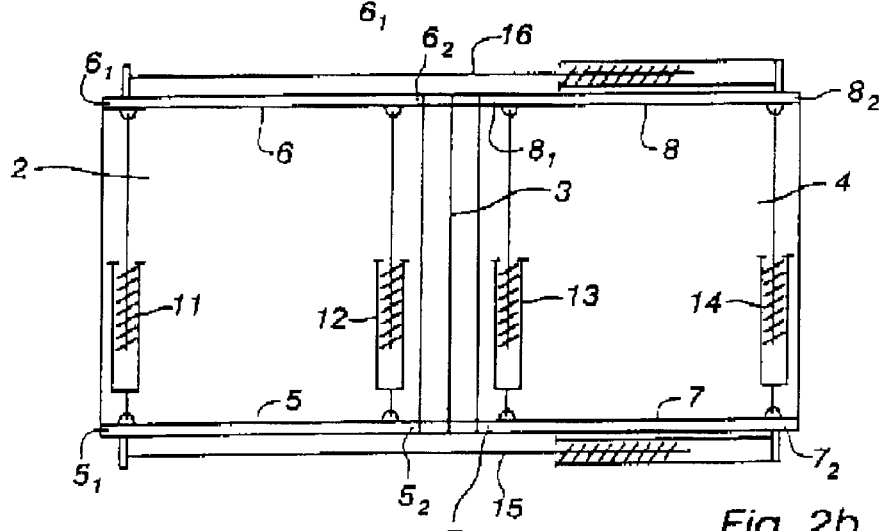

The apparatus shown in FIGS. 2a and 2b employs two basic apparatus of FIGS. 1a and 1b, which are hinged to each other about a line 3. The first apparatus has a reference contour 2, panels 5 and 6, and jackscrews 11 and 12. The second apparatus has a reference contour 4, panels 7 and 8, and jackscrews 13 and 14 arranged parallel to jackscrews 11 and 12 and approximately in the same way with respect to panels 7 and 8 as jackscrews 11 and 12 with respect to panels 5 and 6. This arrangement enables an independent adjustment of the curvatures of reference contours 2 and 4. Once adjusted, it is possible to adjust the angle a between reference contours 2 and 4, which are hinged at 3, by acting upon jackscrews 15 and 16 that engage in the vicinity of ends $5_1$ and $7_2$ of panels 5 and 7 as regards jackscrew 15, and ends $6_1$ and $8_2$ of panels 6 and 8 as regards jackscrew 16. This apparatus is suitable for a large portion of required complex surface variations.

Figure 4A:
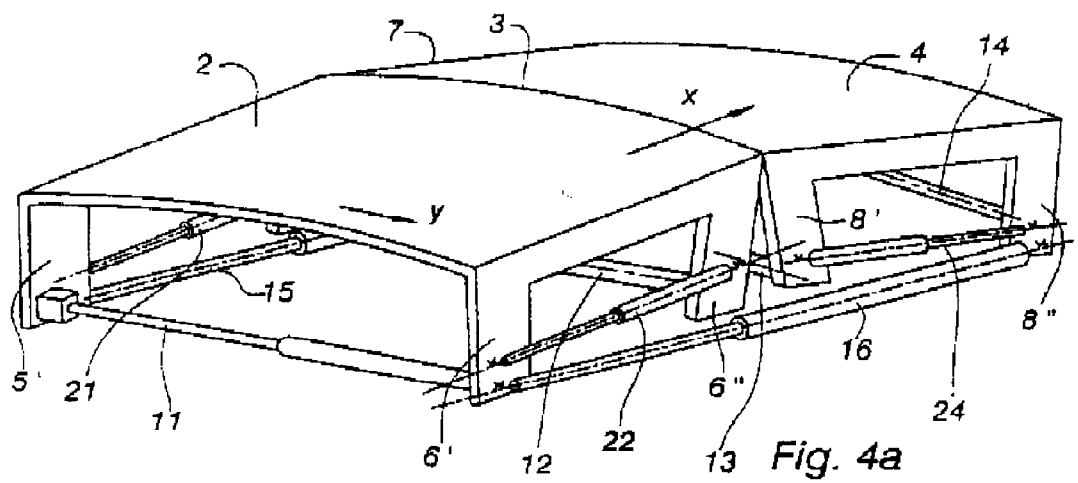
FIGS. 4a and 4b illustrate a preferred embodiment of the invention, which makes it possible to apply in both a transverse and a longitudinal direction a deformation to a mandrel comprising two hinged portions, with an angle variation between the two portions, and which is particularly suitable in the case of a WOLTER type I optical system shown in FIG. 3.
Figure 4B:
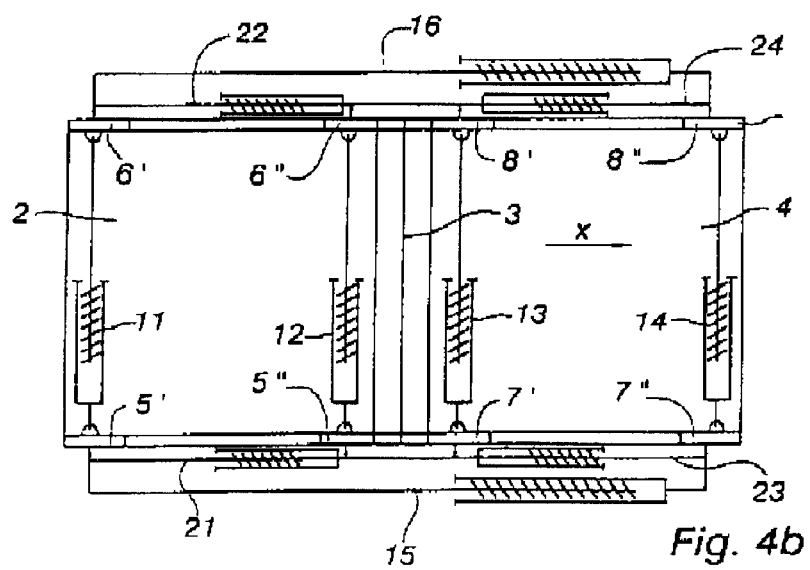

The embodiment of FIGS. 4a and 4b makes it possible to vary the curvature of reference contours 2 and 4 independently in the above-mentioned directions F and F', while maintaining the possibility of varying the angle α with the aid of jackscrews 15 and 16. To this end, the panels 5, 6, 7, and 8 do no longer consist of one piece. Instead, they comprise two end portions 5', 5"; 6', 6"; 7', 7"; and 8', 8". Jackscrews 21 and 22, whose ends are integral respectively with legs 5', 5' as regards jackscrew 21, and legs 6', 6" as regards jackscrew 22, permit adjusting the curvature of reference contour 2 perpendicularly to the adjustment of the curvature that is obtained by the action of jackscrews 11 and 12. The same applies to reference contour 4 with jackscrews 23 and 24, whose ends are integral with legs 7' and 7" as regards jackscrew 23, and legs 8' and 8" as regards jackscrew 24. The jackscrews 23 and 24 permit adjusting the curvature of reference contour 4 perpendicularly to the contour adjustment obtained with jackscrews 13 and 14.

Naturally, this embodiment may be used for a single reference contour 2.

Figure 3:
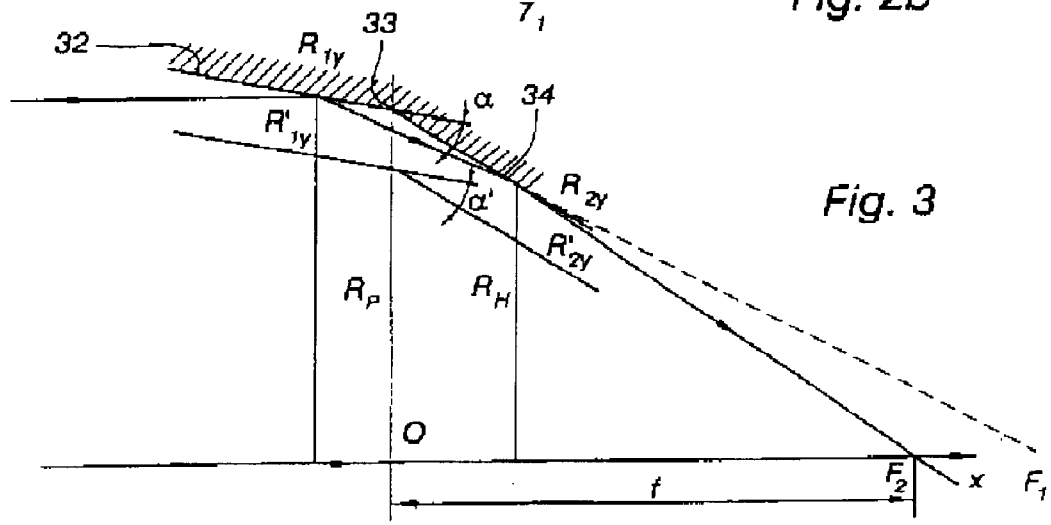

The apparatus of FIGS. 4a and 4b makes it possible to produce variations of all types of complex surfaces, and in particular of a WOLTER type I optical system, as shown in FIG. 3. This optical system shows a first parabolic surface 32, whose focal point $F_1$ constitutes an intermediate focus of the WOLTER type I optical system, and a second hyperbolic surface 34, which permits defining a final focal point $F_2$ (common to all rings), and is located on the Ox axis at a distance f from the hinge line 33 between the surfaces 32 and 34 (see FIG. 3). The Ox axis is an axis of rotation common to all rings or modules.

The embodiment of FIGS. 4a and 4b makes it possible to construct a mandrel for an angular section, for example, from 10° to 20° for a WOLTER type I optical system. It should be remarked that the coupling system of the jackscrews is entirely disengaged from the plane of surfaces 2 and 4, which makes these surfaces entirely free and available for constructing the optical system. When applied to a WOLTER type I telescope, the apparatus is set, according to FIGS. 4a and 4b, to the desired shape and each mirror is metal plated or molded from a resin, and subsequently separated from the mandrel.

The mirror is a concave conic section and yet has a surface of revolution about the x-axis, whose origin O is selected in the plane of the intersection between parabola 32 and hyperbola 34 (see FIG. 3).

In the direction x (which is that of arrow F' of FIG. 1a), the radius Rp(x) of the parabolic segment 32 is defined by:

$$Rp(x) = \sqrt{A(B + f - x)} \quad (x < 0)$$

A and B are specified parameters, which characterize the optics, f designates the focal length $OF_2$.

The radius RH(x) of the hyperbolic segment 34 is defined by:

$$RH(x) = \sqrt{C(D + f - x)^2 + E} \quad (x > 0)$$

C, D, and E are specified parameters, which characterize the optics.

These parameters make it possible to determine the actions that are to be applied to the different jackscrews, in particular when assimilating the parabolic profile 32 and the hyperbolic profile 34 to circular arcs in a first approximation.

In particular, in the case of the envisaged application to a WOLTER I optical system, the mirrors are constructed by depositing metal, or by molding, and subsequent separation from mandrels that have previously been deformed to the desired shape. The use of a cylindrical mandrel in a nondeformed state facilitates polishing.

For other applications, the surfaces 2 and 4 are metallized, so that they form deformable mirrors. Yet, the fact that one starts from a cylindrical mandrel or a plane in a not-yet deformed state, facilitates polishing. As shown in the drawings, the jackscrews are spaced out from the surfaces 2 and 4, and it would be easy to distribute them to the interior of the perimeter delimited by these surfaces, so as to make deformable modular mirrors that are easy to assemble side by side.

In the longitudinal direction Ox, a same force of deformation applied by jackscrews 21 and 22 makes it possible to approximate the parabolic profile 32 (see FIG. 3). A same deformation force applied by jackscrews 23 and 24 makes it possible to approximate the hyperbolic profile 34.

In the transverse direction $O_Y$, the curvatures $R_{1Y}$ of profile 32 and $R_{2Y}$ of profile 34 are obtained by applying different forces to jackscrews 11 and 12 on the one hand, and 13 and 14 on the other.

What is claimed is:

1. Method of producing a mirror, comprising the steps of:
   generating a reference contour,
   providing an apparatus for deforming the reference contour along at least one direction to obtain an angular conic section with a desired shape,
   deforming the reference contour according to said desired shape to define an angular section of a mandrel with a shape that is complementary to that desired for said mirror;
   producing on said angular section a coating that forms said mirror by metal depositing, resin replication, or molding from the reference contour;
   separating the mirror from the angular section of the mandrel, said mirror having a reference surface of said desired shape that is complementary to the shape of the mandrel; and
   using the same angular section of the mandrel to make a plurality of mirror elements having different shapes.

2. Method according to claim 1, wherein the angular conic section is generated with an aspheric generating line.

3. Method according to claim 1, wherein the deformation apparatus is provided with a device for adjusting the deformation in a transverse direction.

4. Method according to claim 1, wherein the deformation apparatus is provided with a device for adjusting the deformation in a longitudinal direction.

5. Method according to claim 1, wherein the reference contour is plane, cylindrical, or conical.

6. Method according to claim 1, wherein the reference contour is truncated, with an aspheric generating line.

7. Method according to claim 6, wherein the reference contour corresponds to a first ring of a WOLTER type telescope, and the desired shape corresponds to a second ring of a WOLTER type telescope.

8. Method according to claim 1, wherein the step of providing an apparatus for deforming the reference contour comprises providing at least one jackscrew to apply a moment to the reference contour and cause a curvature thereof.

9. Method of producing an optical beam focusing surface, comprising the steps of generating a reference contour, and providing an apparatus for deforming the reference contour along at least one direction to obtain an angular conic section with a desired shape, wherein the reference contour has a first portion and a second portion that are hinged to each other along a hinge line, the first and the second portions having a first and a second reference contour, respectively, and
   wherein the first portion is provided with a device for adjusting the deformation of the first reference contour in a transverse direction, or with a device for adjusting the deformation of the first reference contour in a longitudinal direction, or with devices for adjusting the deformation of the first reference contour in both a transverse direction and in a longitudinal direction; and
   the second portion is provided with a device for adjusting the deformation of the second reference contour in a transverse direction, or with a device for adjusting the deformation of the second reference contour in a longitudinal direction, or with devices for adjusting the deformation of the second reference contour in both a transverse direction and in a longitudinal direction.

10. Method according to claim 9, wherein the apparatus for deforming the reference contour has a device for adjusting an angle ($\alpha$) that is formed by the first and the second hinged portions.

11. A system comprising a reference contour, and a device for deforming said reference contour along at least one direction to obtain a conic section, wherein the reference contour has a first portion and a second portion that are hinged to each other along a hinge line, the first and the second portions having a first and a second reference contour, respectively, and wherein the first portion is provided with a device for adjusting the deformation of the first reference contour in a transverse direction, or with a device for adjusting the deformation of the first reference contour in a longitudinal direction, or with devices for adjusting the deformation of the first reference contour in both a transverse direction and in a longitudinal direction; and the second portion is provided with a device for adjusting the deformation of the second reference contour in a transverse direction, or with a device for adjusting the deformation of the second reference contour in a longitudinal direction, or with devices for adjusting the deformation of the second reference contour in both a transverse direction and in a longitudinal direction.

12. System according to claim 11, wherein the device for deforming said reference contour has a device for adjusting the angle ($\alpha$) that is formed by the first and second hinged portions.

13. System according to claim 11 wherein the reference contour of at least one of said first and second portions is adjustable along the transverse direction and the longitudinal direction, and wherein it has two pairs of end legs, of which each receives an end of a jackscrew for adjusting the deformation in the transverse direction and of a jackscrew for adjusting the deformation in a longitudinal direction.

* * * * *